United States Patent
Armitage et al.

(10) Patent No.: US 10,338,952 B2
(45) Date of Patent: *Jul. 2, 2019

(54) PROGRAM EXECUTION WITHOUT THE USE OF BYTECODE MODIFICATION OR INJECTION

(71) Applicant: INTERNATIONAL BUSINESS MACHINES CORPORATION, Armonk, NY (US)

(72) Inventors: Joshua H. Armitage, Ellenbrook (AU); Michael P. Clarke, Ellenbrook (AU); John A. W. Kaputin, Rockingham (AU); King-Yan Kwan, Perth (AU); Andrew Wright, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,215

(22) Filed: Apr. 30, 2018

(65) Prior Publication Data

US 2018/0246753 A1 Aug. 30, 2018

Related U.S. Application Data

(63) Continuation of application No. 15/005,295, filed on Jan. 25, 2016, now Pat. No. 9,996,379.

(51) Int. Cl.
*G06F 9/455* (2018.01)
*G06F 9/54* (2006.01)
(Continued)

(52) U.S. Cl.
CPC ...... *G06F 9/45558* (2013.01); *G06F 9/45504* (2013.01); *G06F 9/45508* (2013.01);
(Continued)

(58) Field of Classification Search
CPC ............. G06F 9/4425; G06F 9/44521; G06F 11/0712; G06F 11/0793; G06F 11/301; G06F 11/3089; G06F 9/485
See application file for complete search history.

(56) References Cited

U.S. PATENT DOCUMENTS

| 6,779,180 B1 * | 8/2004 | Palm | G06F 9/4484 718/100 |
| 7,181,511 B1 * | 2/2007 | Grenier | G06F 9/4411 701/36 |

(Continued)

OTHER PUBLICATIONS

Dong et al., "How to Retransform a Class at Runtime," Stack Overflow, Sep. 2, 2013, p. 1-9, Stack Exchange Inc., http://stackoverflow.com/questions/18567552/how-to-retransform-a-class-at-runtime, Accessed on Oct. 7, 2015.

(Continued)

*Primary Examiner* — Dong U Kim
(74) *Attorney, Agent, or Firm* — Michael O'Keefe

(57) ABSTRACT

A method for registering a plurality of callbacks. The method may include receiving at least one callback function in a virtual machine, which includes a plurality of callback registration information. The method may include registering each at least one received callback function in a virtual machine tool interface within the virtual machine to a list of callback functions for an event based on the plurality of callback registration information. The method may include monitoring the virtual machine for an occurrence of the event. The method may include determining the event has occurred. The method may also include generating a local frame for each at least one registered callback function within the list of callback functions for the determined event. The method may include executing each at least one regis- (Continued)

tered callback function based on each generated local frame associated with each at least one registered callback function.

20 Claims, 11 Drawing Sheets

(51) Int. Cl.
*H04L 29/08* (2006.01)
*H04L 29/06* (2006.01)
(52) U.S. Cl.
CPC ...... *G06F 9/54* (2013.01); *G06F 2009/45591* (2013.01); *G06F 2009/45595* (2013.01); *H04L 29/08072* (2013.01); *H04L 67/40* (2013.01)

(56) References Cited

U.S. PATENT DOCUMENTS

| | | | | |
|---|---|---|---|---|
| 8,397,227 B2* | 3/2013 | Fan | ............ | G06F 9/445 717/158 |
| 8,527,944 B2* | 9/2013 | Teng | ............ | G06F 11/3636 717/110 |
| 8,863,093 B1* | 10/2014 | Chou | ............ | G06F 9/45504 717/124 |
| 2007/0168996 A1* | 7/2007 | Klein | ............ | G06F 11/3419 717/129 |
| 2008/0120553 A1* | 5/2008 | Bergman | ............ | H04L 41/22 715/740 |
| 2008/0307394 A1* | 12/2008 | Marchant | ............ | G06F 9/44521 717/120 |
| 2010/0058338 A1* | 3/2010 | Schneider | ............ | G06F 9/45533 718/1 |
| 2010/0287352 A1* | 11/2010 | Chapman | ............ | G06F 11/3644 711/170 |
| 2011/0145791 A1* | 6/2011 | Kim | ............ | G06F 11/3644 717/124 |
| 2011/0231861 A1* | 9/2011 | Liddell | ............ | G06F 9/485 719/315 |
| 2012/0167067 A1* | 6/2012 | Low | ............ | G06F 9/4484 717/148 |
| 2013/0283090 A1* | 10/2013 | Bradley | ............ | G06F 11/0793 714/2 |
| 2014/0075422 A1* | 3/2014 | Rasmussen | ............ | G06F 8/656 717/148 |
| 2014/0229947 A1* | 8/2014 | Daudel | ............ | G06F 9/44521 718/1 |
| 2015/0277866 A1* | 10/2015 | Wang | ............ | G06F 13/10 717/148 |
| 2017/0212775 A1 | 7/2017 | Armitage | | |

OTHER PUBLICATIONS

Gassen, "Analysing Malicious Java Applets at Runtime Using the JVMTI," Codecentric Blog, Dec. 15, 2014, p. 1-4, codecentric AG, https://blog.codecentric.de/en/2014/12/analysing-malicious-java-applets-runtime-using-jvmti/, Accessed on Oct. 7, 2015.

Mell et al., "The NIST Definition of Cloud Computing," National Institute of Standards and Technology, Sep. 2011, p. 1-3, Special Publication 800-145.

IBM: List of IBM Patents or Patent Applications Treated as Related (Appendix P), May 2, 2018, pp. 1-2.

\* cited by examiner

PROGRAM EXECUTION WITHOUT THE USE OF BYTECODE MODIFICATION OR INJECTION

BACKGROUND

The present invention relates generally to the field of computing, and more particularly to virtual machines.

A virtual machine framework, such as a Java® virtual machine (JVM) (Java and all Java-based trademarks and logos are trademarks or registered trademarks of Oracle Corporation and/or its affiliates), provides an efficient organization and utilization of real world data. The virtual machine framework may be a group of classes and interfaces implementing a set of frequently used and reusable data structures. Furthermore, the virtual machine may be a powerful non-persistent data organization architecture, which provides software modules with a high degree of reusability. Additionally, the virtual machine may be updated during execution through modification and/or injection of bytecode lines into the existing framework.

SUMMARY

According to one embodiment, a method for registering a plurality of callbacks. The method may include receiving at least one callback function in a virtual machine, whereby each at least one callback function includes a plurality of callback registration information. The method may also include registering each at least one received callback function in a virtual machine tool interface within the virtual machine to a list of callback functions for an event based on the plurality of callback registration information. The method may further include monitoring the virtual machine for an occurrence of the event. The method may also include determining the event has occurred. The method may also include generating a local frame for each at least one registered callback function within the list of callback functions for the determined event. The method may further include executing each at least one registered callback function based on each generated local frame associated with each at least one registered callback function.

According to another embodiment, a computer system for registering a plurality of callbacks. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving at least one callback function in a virtual machine, whereby each at least one callback function includes a plurality of callback registration information. The computer system may also include registering each at least one received callback function in a virtual machine tool interface within the virtual machine to a list of callback functions for an event based on the plurality of callback registration information. The computer system may further include monitoring the virtual machine for an occurrence of the event. The computer system may also include determining the event has occurred. The computer system may also include generating a local frame for each at least one registered callback function within the list of callback functions for the determined event. The computer system may further include executing each at least one registered callback function based on each generated local frame associated with each at least one registered callback function.

According to yet another embodiment, a computer program product for registering a plurality of callbacks. The computer program product may include one or more computer-readable storage devices and program instructions stored on at least one of the one or more tangible storage devices, the program instructions executable by a processor. The computer program product may include program instructions to receive at least one callback function in a virtual machine, whereby each at least one callback function includes a plurality of callback registration information. The computer program product may also include program instructions to register each at least one received callback function in a virtual machine tool interface within the virtual machine to a list of callback functions for an event based on the plurality of callback registration information. The computer program product may further include program instructions to monitor the virtual machine for an occurrence of the event. The computer program product may also include program instructions to determine the event has occurred. The computer program product may also include program instructions to generate a local frame for each at least one registered callback function within the list of callback functions for the determined event. The computer program product may further include program instructions to execute each at least one registered callback function based on each generated local frame associated with each at least one registered callback function.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
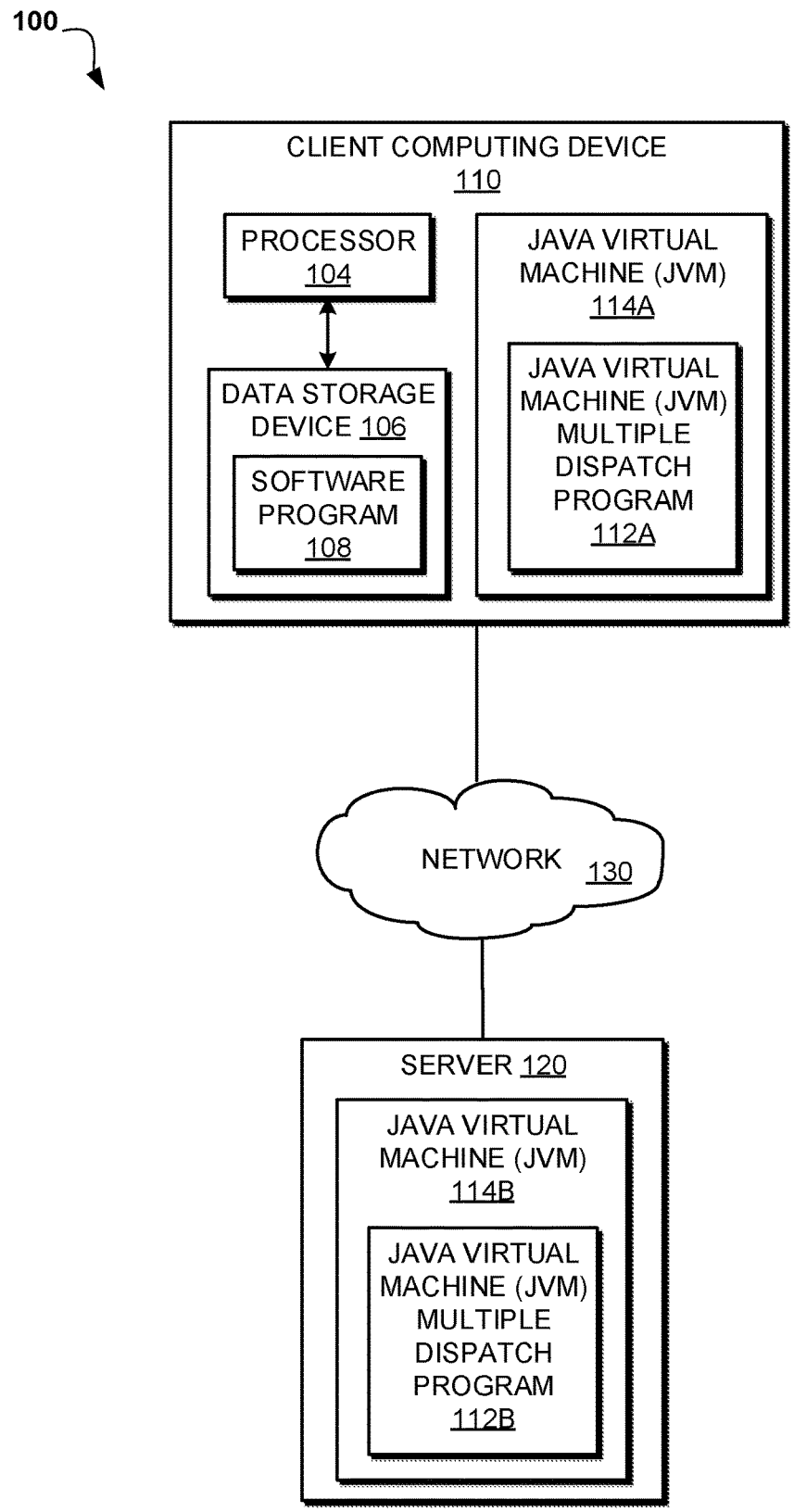
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to virtual machines. The following described exemplary embodiments provide a system, method, and program product to, among other things, implement a multiple dispatch system as an add-on to a virtual machine tool interface, such as a Java® virtual machine tool interface (JVMTI), to register and deregister multiple callbacks from the virtual machine. Therefore, the present embodiment has the capacity to improve the technical field of virtual machines by enabling and simplifying the registration and deregistration of multiple callbacks rather than a single callback. Additionally, the need to verify and debug modified and injected bytecode or the use of third party application programming interfaces (APIs) for generating bytecode may be eliminated.

As previously described, a virtual machine framework, such as a Java® virtual machine (JVM), provides an efficient organization and utilization of real world data. The virtual machine framework may be a group of classes and interfaces implementing a set of frequently used and reusable data structures. Furthermore, the virtual machine may be a powerful non-persistent data organization architecture, which provides software modules with a high degree of reusability. Additionally, the virtual machine may be updated during execution through modification and/or injection of bytecode lines into the existing framework.

Many virtual machines utilize a virtual machine tool interface, such as a JVMTI, to register and deregister callbacks from the virtual machine. The virtual machine tool interface may allow a program to determine an application state and control an application running in a virtual machine. For example, the virtual machine tool interface may allow a user to detect events, such as breakpoint events, class prepare events, and virtual machine death events, which occur within the virtual machine or executed function calls. The virtual machine tool interface may be a skeletal API that may require a significant amount of scaffolding or boilerplate code. The virtual machine tool interface may allow the bytes of a class file to be overwritten but may not allow the addition or removal of new methods or fields, thereby, limiting the capabilities of any desired change in execution. Furthermore, some events within the virtual machine tool interface, such as method entries and exits, may be burdensome and expensive on system resources. Additionally, some virtual machines may have vendor specific extensions to target particular method entry or exit events directly, which may limit utility across different virtual machine implementations.

Virtual machines may utilize executable files, such as class files. Each executable file may contain cross-platform bytecode that is read by the virtual machine as the executable file is run. At times, a developer may wish to change code within an executable file. Changing and/or instrumenting the behavior of a program running on a virtual machine may require bytecode injection. Bytecode injection may involve modifying a class file by injecting code into the class file at runtime. Typically, bytecode injection is used to instrument programs at runtime. For example, bytecode injection may be used for debugging, logging, tracing, or to enhance a language, such as aspect-oriented programming. However, strict requirements may exist within the bytecode, which may make modification difficult to achieve or make the bytecode error prone when executed.

Currently, an industry standard for modifying a class file at runtime or compilation time does not exist. Modification may be achieved through utilization of third party libraries with different levels of usability, support, limitations, conformance, and correctness. Since each third party library may be different, the methods in which each library is utilized and each library's capabilities may vary. Furthermore, while many libraries are mature, bytecode itself is comparatively low level and may require a significant level of expertise to use and debug. As such, it may be advantageous, among other things, to implement a system that builds a multiple dispatch system upon the virtual machine tool interface API.

According to one embodiment, a multiple dispatch system may be installed as an add-on to the virtual machine tool interface. The multiple dispatch system may enable and simplify the registration and deregistration of multiple callbacks for a virtual machine event rather than a single callback. To enable execution modification, a user may provide multiple callbacks and locations to inject those callbacks. The registration system may process the provided callbacks through registration and deregistration at appropriate times during the execution of the virtual machine. By enabling the registration and deregistration of multiple callbacks, system correctness may be increased while minimizing system resource usage since multiple callbacks may be processed concurrently rather than consecutively. Furthermore, the present embodiment may not require the use of third party libraries that are needed in many standard virtual machine tool interfaces and native interfaces. Additionally, since the existing bytecode used to construct the virtual machine tool interface is used, no special requirements may be imposed upon users of the virtual machine tool interface code.

A typical virtual machine tool interface may only support one callback per event. The framework may also maintain a list of callbacks for each event. The callbacks may run in the same thread in which the event occurs. Many virtual machine tool interfaces and a native interfaces incorporate the concept of stack framing, which may be distinguished from native stack frames. Stack frames may be used to manage local references to objects. In typical virtual machine tool interface operation, each stack frame is handled by the virtual machine tool interface. To maintain the same illusion and isolation between multiple callbacks for the same event, the multiple dispatch system may transparently establish a stack frame environment for each callback. Thereafter, callbacks may initiate a deregistration process through a natural progression. For example, callbacks designed to only run once may begin deregistration after the callback's execution.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize a multiple dispatch system in conjunction with the virtual machine tool interface to allow for registration and deregistration of multiple callbacks where typical virtual machine tool interfaces may only support one callback per event. Furthermore, the multiple dispatch system may utilize a stack frame environment for each callback transparently.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program 108, a JVM Multiple Dispatch Program 112A and JVM 114A, and communicate with the server 120 via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 110 may include internal components 602a and external components 604a, respectively.

The server computer 120 may be a laptop computer, netbook computer, personal computer (PC), a desktop computer, or any programmable electronic device capable of hosting a JVM Multiple Dispatch Program 112B and JVM 114B and communicating with the client computing device 110 via the communication network 130, in accordance with embodiments of the invention. As will be discussed with reference to FIG. 6, the server computer 120 may include internal components 602b and external components 604b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the JVM 114A, 114B may be a computing virtual machine that enables a computer, such as client computing device 110 and server 120, to run a Java® program. The JVM 114A, 114B may function based the architecture and functions of the client computing device 110 and/or server 120. The JVM 114A, 114B may include a virtual machine tool interface, such as JVMTI.

According to the present embodiment, the JVM Multiple Dispatch Program 112A, 112B may be a program capable of registering and deregistering multiple callbacks for a JVM event. The JVM Multiple Dispatch Program 112A, 112B is explained in further detail below with respect to FIG. 2A, FIG. 2B, FIG. 3, FIG. 4A, FIG. 4B, FIG. 5A, and FIG. 5B.

Figure 2A:
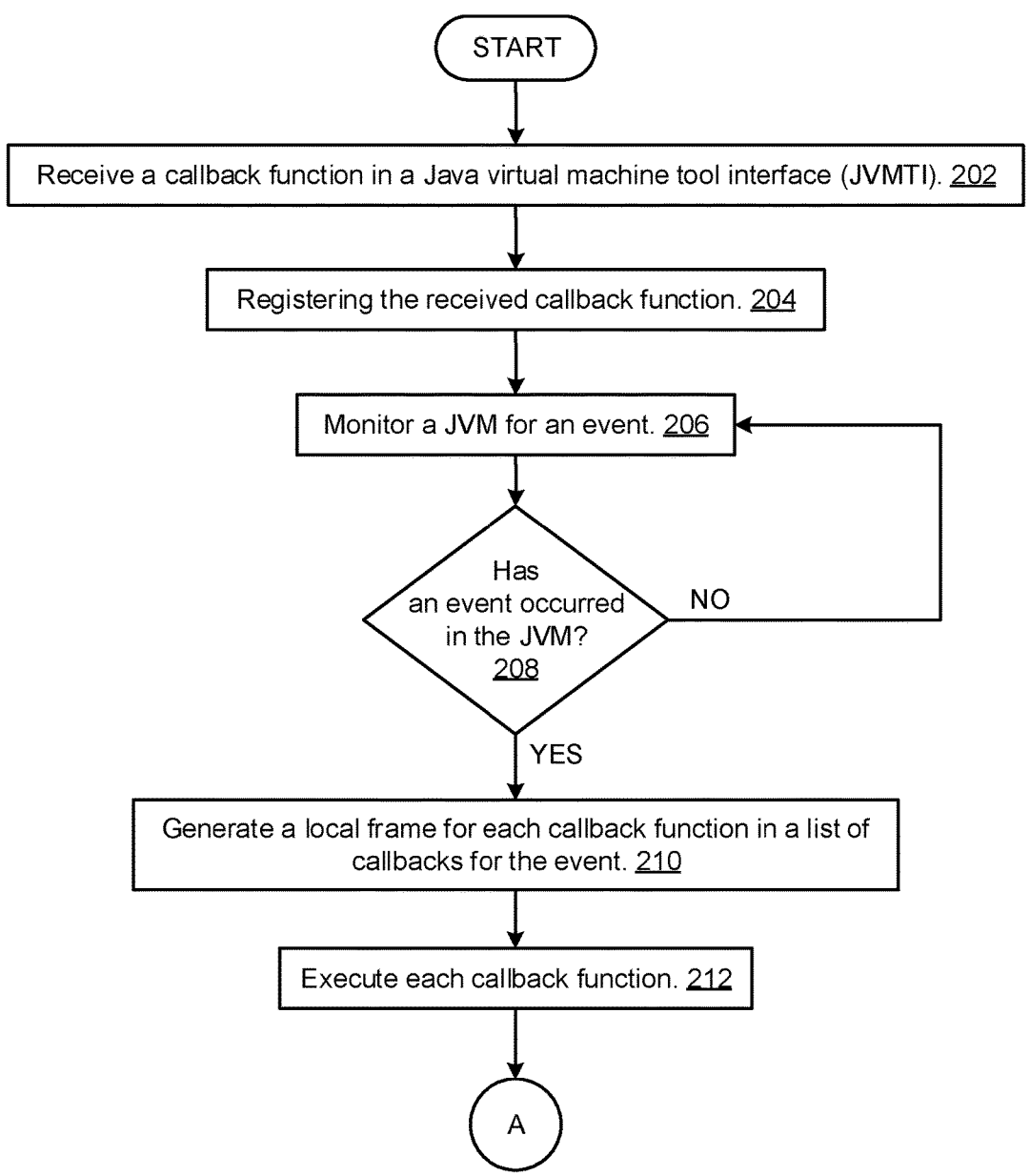
FIGS. 2A and 2B illustrate an operational flowchart of the steps carried out by a virtual machine multiple dispatch program, in accordance with one embodiment of the present invention.
Figure 2B:
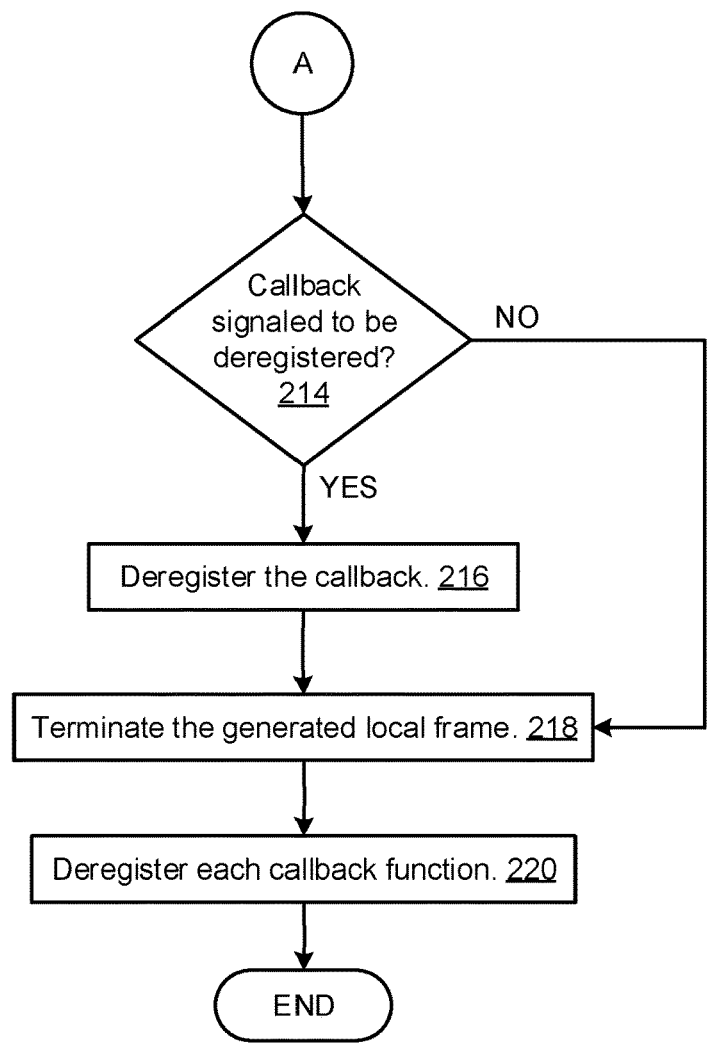

Referring now to FIGS. 2A and 2B, an operational flowchart 200 of the steps carried out by a virtual machine multiple dispatch program is depicted, in accordance with one embodiment of the present invention. In FIG. 2A, at 202, the JVM Multiple Dispatch Program 112A, 112B (FIG. 1) receives a callback function submitted by a user. The JVM Multiple Dispatch Program 112A, 112B (FIG. 1), running the JVMTI, may receive a callback function from a user that the user desires to register in the JVMTI. As previously described, the JVMTI may allow a program to determine an application state and control an application running in a virtual machine. For example, the JVMTI may allow a user to detect events, such as breakpoint events, class prepare events and virtual machine death events, which occur within the JVM 114A, 114B (FIG. 1) or executed function calls. The received callback function may include specific callback registration information, such as the callback name, the callback class, the method name, the method signature, and the bytecode location.

Next at 204, the JVM Multiple Dispatch Program 112A, 112B (FIG. 1) registers the received callback function. The JVM Multiple Dispatch Program 112A, 112B (FIG. 1) may register the received callback function so that the applicable action is taken by the JVM 114A, 114B (FIG. 1) upon the occurrence of the appropriate JVM event. The registering of the received callback function is discussed in further detail with respect to FIG. 4A, FIG. 4B, FIG. 5A, and FIG. 5B.

Then at 206, the JVM Multiple Dispatch Program 112A, 112B (FIG. 1) monitors the JVM 114A, 114B (FIG. 1) for a JVM event. The JVM Multiple Dispatch Program 112A, 112B (FIG. 1) may utilize the JVMTI to monitor the JVM 114A, 114B (FIG. 1) for the occurrence of a JVM event, such as a breakpoint event, a class prepare event, or a virtual machine death event.

Next at 208, the JVM Multiple Dispatch Program 112A, 112B (FIG. 1) determines whether an event has occurred in the JVM 114A, 114B (FIG. 1). According to one implementation, the method may continue along the operational flowchart 200, if an event has occurred in the JVM 114A, 114B (FIG. 1). If the JVM Multiple Dispatch Program 112A, 112B (FIG. 1) determines an event has occurred (step 208, "YES" branch), the JVM Multiple Dispatch Program 112A, 112B (FIG. 1) may continue to step 210 to generate a local frame for each callback function in a list of callbacks for the event. If the JVM Multiple Dispatch Program 112A, 112B (FIG. 1) determines an event has not occurred (step 208, "NO" branch), the JVM Multiple Dispatch Program 112A, 112B (FIG. 1) may return to step 206 to monitor the JVM 114A, 114B (FIG. 1) for an event.

Then at 210, the JVM Multiple Dispatch Program 112A, 112B (FIG. 1) generates, or pushes, a local frame for each callback function in a list of callback functions for the event. As previously described, a typical JVMTI allows only one callback function to be registered for a JVM event. However, the JVM Multiple Dispatch Program 112A, 112B (FIG. 1) may allow a user to register multiple callback functions for a JVM event. Therefore, each event may have a list of callback functions associated with the event. When a JVM event occurs, the JVM Multiple Dispatch Program 112A, 112B (FIG. 1) may generate a local frame for each callback function on the list of callback functions associated with the occurred JVM event. A local frame may be a stack frame that maintains references to objects, such as Java® objects, that are created within the context of the occurred event. The local frame may be a storage device that the callback may be able to access.

Next at 212, the JVM Multiple Dispatch Program 112A, 112B (FIG. 1) executes each callback function in the list of callback functions for the event. Once the local frame for each callback on the list of callback function is created, the JVM Multiple Dispatch Program 112A, 112B (FIG. 1) may execute each callback function during the standard operation of the JVM 114A, 114B (FIG. 1). The execution of callback functions is discussed in further detail with respect to FIG. 3.

Referring now to FIG. 2B, at 214, the JVM Multiple Dispatch Program 112A, 112B (FIG. 1) determines whether the callback is signaled to be deregistered. According to one implementation, the method may continue along the operational flowchart 200, if the callback is signaled to be deregistered. Depending on the classification or type of callback, the JVM Multiple Dispatch Program 112A, 112B (FIG. 1) may deregister the callback immediately after execution. Similarly, the JVM Multiple Dispatch Program 112A, 112B (FIG. 1) may defer deregistration of the callback based on a user preconfigured deregistration scheme. The JVM Multiple Dispatch Program 112A, 112B (FIG. 1) may defer deregistration of the callback if the callback should not be deregistered immediately after execution. If the JVM Multiple Dispatch Program 112A, 112B (FIG. 1) determines the callback is signaled to be deregistered (step 214, "YES" branch), the JVM Multiple Dispatch Program 112A, 112B (FIG. 1) may continue to step 216 to deregister the callback. If the JVM Multiple Dispatch Program 112A, 112B (FIG. 1) determines the callback is not signaled to be deregistered (step 214, "NO" branch), the JVM Multiple Dispatch Program 112A, 112B (FIG. 1) may continue to step 218 to terminate the generated local frame.

Next at 216, the JVM Multiple Dispatch Program 112A, 112B (FIG. 1) deregisters the callback from the occurred JVM event. Based on the classification of the callback function, the JVM Multiple Dispatch Program 112A, 112B (FIG. 1) may deregister the callback immediately after execution of the callback. When deregistering the callback, the JVM Multiple Dispatch Program 112A, 112B (FIG. 1) removes the callback function from the list of callback functions associated with the occurred JVM event. Therefore, if the JVM event occurs again at a later time, the deregistered callback function may not have a local frame generated and the deregistered local frame may not be executed.

Then at 218, the JVM Multiple Dispatch Program 112A, 112B (FIG. 1) terminates, or pops, the generated local frame. When the JVM 114A, 114B (FIG. 1) returns a value for each executed callback function, the JVM Multiple Dispatch Program 112A, 112B (FIG. 1) may pop the generated local frame for the applicable executed callback function. For example, if the JVM 114A, 114B (FIG. 1) created a local frame for a callback function and the callback function was subsequently executed, the JVM 114A, 114B (FIG. 1) may return a value according to the terms of the callback function. Once the JVM Multiple Dispatch Program 112A, 112B (FIG. 1) determines that a value has been returned for the executed callback function by the JVM 114A, 114B (FIG. 1), the JVM Multiple Dispatch Program 112A, 112B (FIG. 1) may pop the generated local frame since the generated local frame is no longer needed.

Next at 220, the JVM Multiple Dispatch Program 112A, 112B (FIG. 1) deregisters each callback function. If, based on the classification or type of callback or the deregistration scheme, the JVM Multiple Dispatch Program 112A, 112B (FIG. 1) has deferred deregistration of the callback functions, the JVM Multiple Dispatch Program 112A, 112B (FIG. 1) may deregister each callback function that was not previously deregistered immediately upon execution in step 216. As previously described, deregistering a callback function removes the callback function from the list of callback functions associated with the occurred JVM event. Therefore, subsequent occurrences of the JVM event may result in a local frame not being generated for the deregistered callback function. Once the JVM Multiple Dispatch Program 112A, 112B (FIG. 1) completes deregistration of the callback functions, JVM Multiple Dispatch Program 112A, 112B (FIG. 1) may terminate and the JVMTI and JVM 114A, 114B (FIG. 1) may continue operations.

It may be appreciated that FIGS. 2A and 2B provide only an illustration of one implementation and do not imply any limitations with regard to how different embodiments may be implemented. Many modifications to the depicted environments may be made based on design and implementation requirements. For example, although the present embodiment is described with respect to a JVM, JVMTI, and Java® Native Interface (JNI), any type of virtual machine, virtual machine tool interface, or native interface capable of compiling JVM bytecode, hosting tooling interfaces, and setting breakpoint events may be used during implementation.

Figure 3:
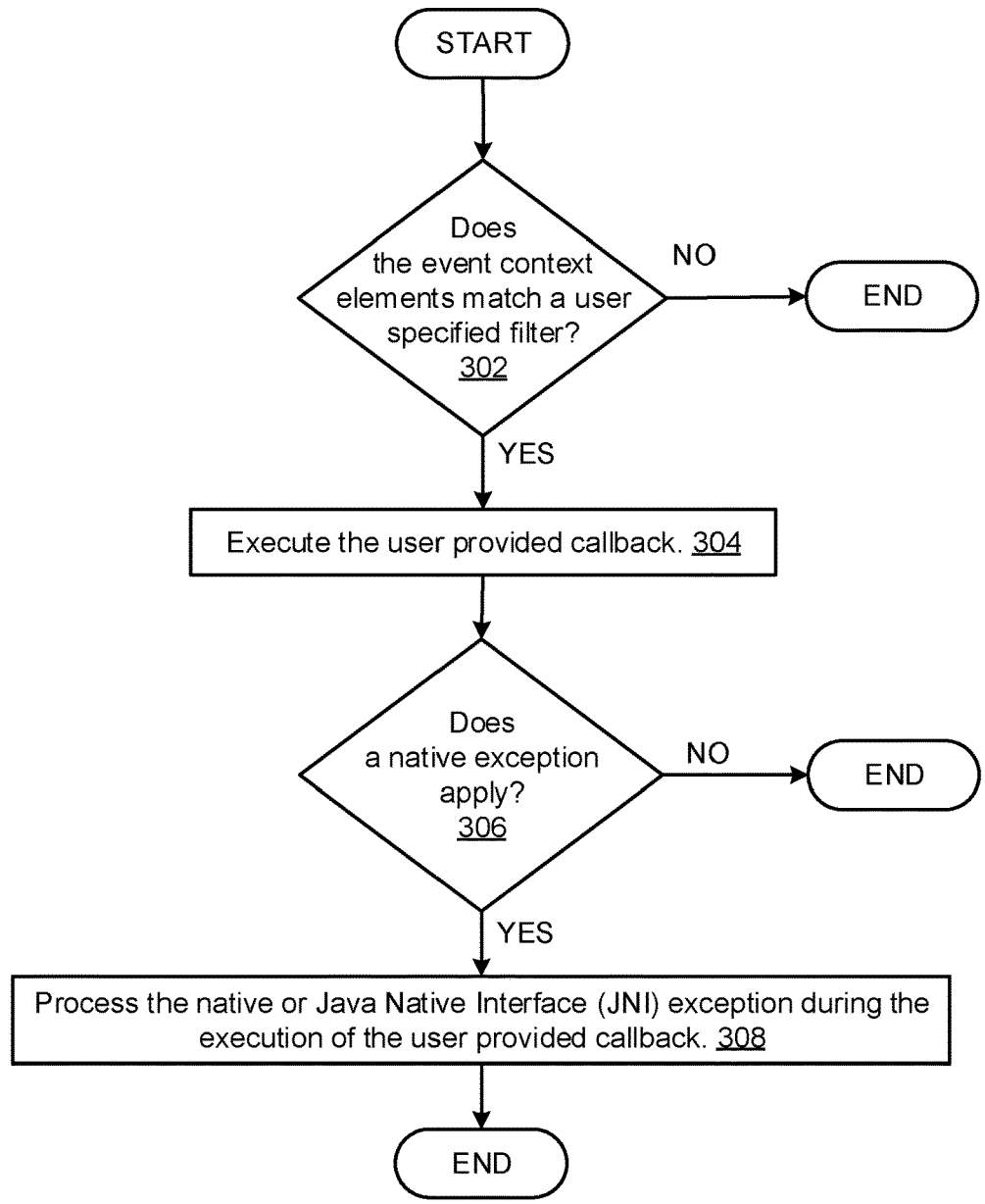
FIG. 3 illustrates a callback execution flowchart of the steps carried out by a virtual machine multiple dispatch program, in accordance with one embodiment of the present invention.

Referring now to FIG. 3, a callback execution flowchart 300 of the steps carried out by a virtual machine multiple dispatch program is depicted, in accordance with one embodiment of the present invention. The callback execution flowchart 300 may illustrate the operational steps when a callback registered through the JVM Multiple Dispatch Program 112A, 112B (FIG. 1) is executed in step 212 in FIG. 2A. The callback execution flowchart 300 may illustrate how the JVM Multiple Dispatch Program 112A, 112B (FIG. 1) provides filtering for the JVM 114A, 114B (FIG. 1). At 302, the JVM Multiple Dispatch Program 112A, 112B (FIG. 1) determines whether the event context elements, or event context information, match a user specified filter. According to one implementation, the method may continue along the callback execution flowchart 300, if the event context elements match a user specified filter. When a user registers a callback with the JVM Multiple Dispatch Program 112A, 112B (FIG. 1), the user may specify filtering criteria to filter events in which the user may be interested. For example, the user may be interested in a JVM event with a particular method name or thread identification number. Therefore, when the user registers a callback, the JVM Multiple Dispatch Program 112A, 112B (FIG. 1) may wrap the registered callback in an enclosing callback that contains the specified filtering criteria, or preconfigured filtering criteria. Each JVM event that occurs may contain event context elements, such as a thread identification number, a method name, and a bytecode location that satisfy one or more preconfigured filtering criteria established in the enclosing callback. If the JVM Multiple Dispatch Program 112A, 112B (FIG. 1) determines the event context elements match all user specified filters or no user specified filter exists (i.e. no enclosing callback surrounds the registered callback) (step 302, "YES" branch), the JVM Multiple Dispatch Program 112A, 112B (FIG. 1) may continue to step 304 to execute the user provided callback. If the JVM Multiple Dispatch Program 112A, 112B (FIG. 1) determines the event context elements do not match a user specified filter (step 302, "NO" branch), the JVM Multiple Dispatch Program 112A, 112B (FIG. 1) may terminate.

Then at 304, the JVM Multiple Dispatch Program 112A, 112B (FIG. 1) executes the user provided callback. Once the JVM Multiple Dispatch Program 112A, 112B (FIG. 1) determines the event context information of the JVM event satisfies the user specified filter within the enclosing callback, the JVM Multiple Dispatch Program 112A, 112B (FIG. 1) may execute the user provided callback enclosed within the enclosing callback.

Next at 306, the JVM Multiple Dispatch Program 112A, 112B (FIG. 1) determines whether a native or JNI error applies to the callback. According to one implementation, the method may continue along the callback execution flowchart 300, if a native or JNI error applies to the callback. If the JVM Multiple Dispatch Program 112A, 112B (FIG. 1) determines a native or JNI error applies to the callback (step 306, "YES" branch), the JVM Multiple Dispatch Program 112A, 112B (FIG. 1) may continue to step 308 to apply the native or JNI error during the execution of the user provided callback. If the JVM Multiple Dispatch Program 112A, 112B (FIG. 1) determines a native or JNI error does not apply to the callback (step 306, "NO" branch), the JVM Multiple Dispatch Program 112A, 112B (FIG. 1) may terminate.

Then at 308, the JVM Multiple Dispatch Program 112A, 112B (FIG. 1) processes the native or JNI error during the execution of the user provided callback. If a native or JNI error occurs in the JVM 114A, 114B (FIG. 1) or on an operating system on the client computing device 110 (FIG. 1) or server 120 (FIG. 1), the error may need to be identified and processed in order to prevent the exception propagating through the call stack, thereby, hindering the flow of the callback execution. Each enclosing callback may include information that acts as a catch for any unexpected errors. Based on the information within the enclosing callback, the JVM Multiple Dispatch Program 112A, 112B (FIG. 1) may ignore the error or correct the error.

Figure 4A:
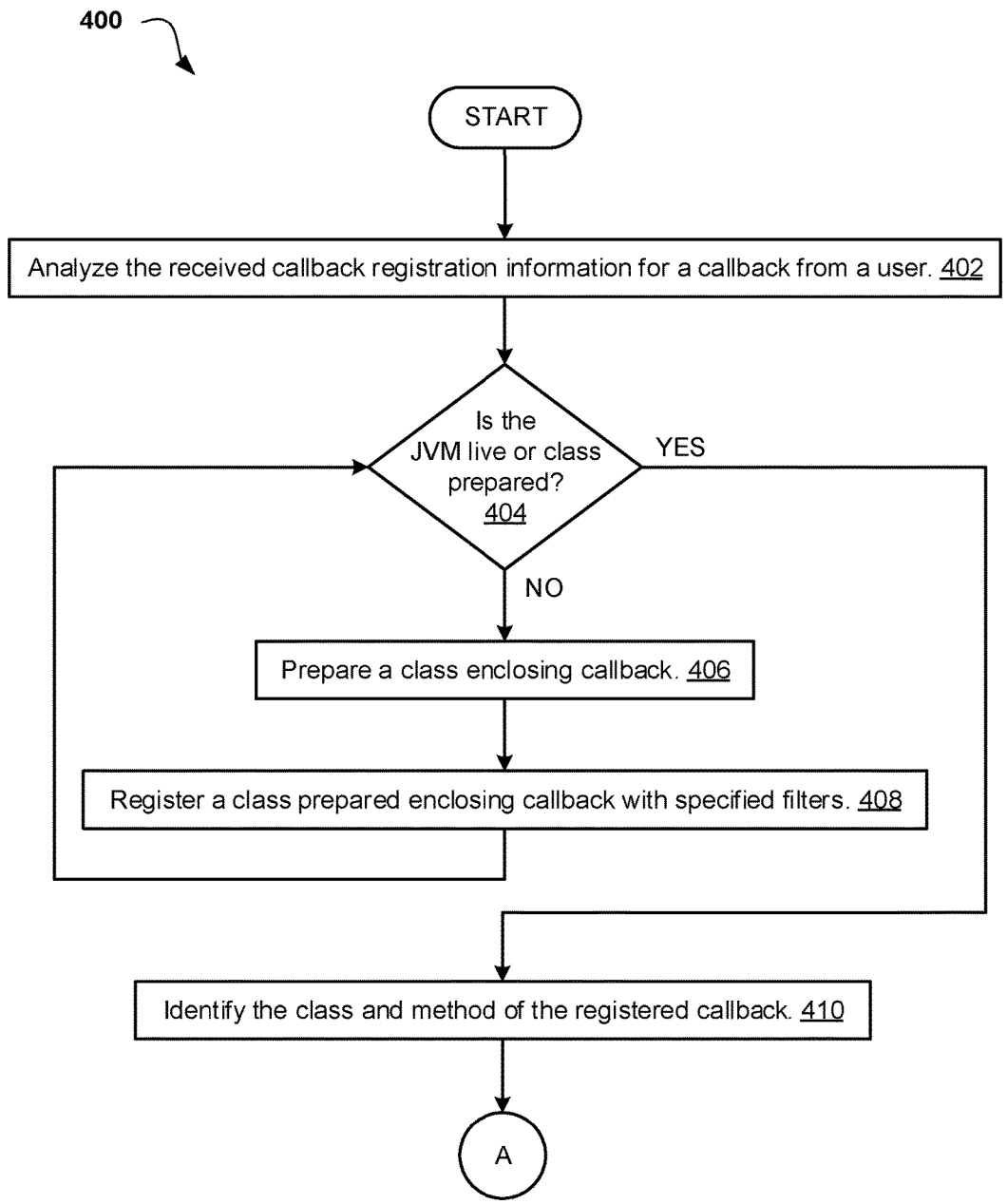
FIGS. 4A and 4B illustrate a bytecode injection simulation flowchart of the steps carried out by a virtual machine multiple dispatch program, in accordance with one embodiment of the present invention.
Figure 4B:
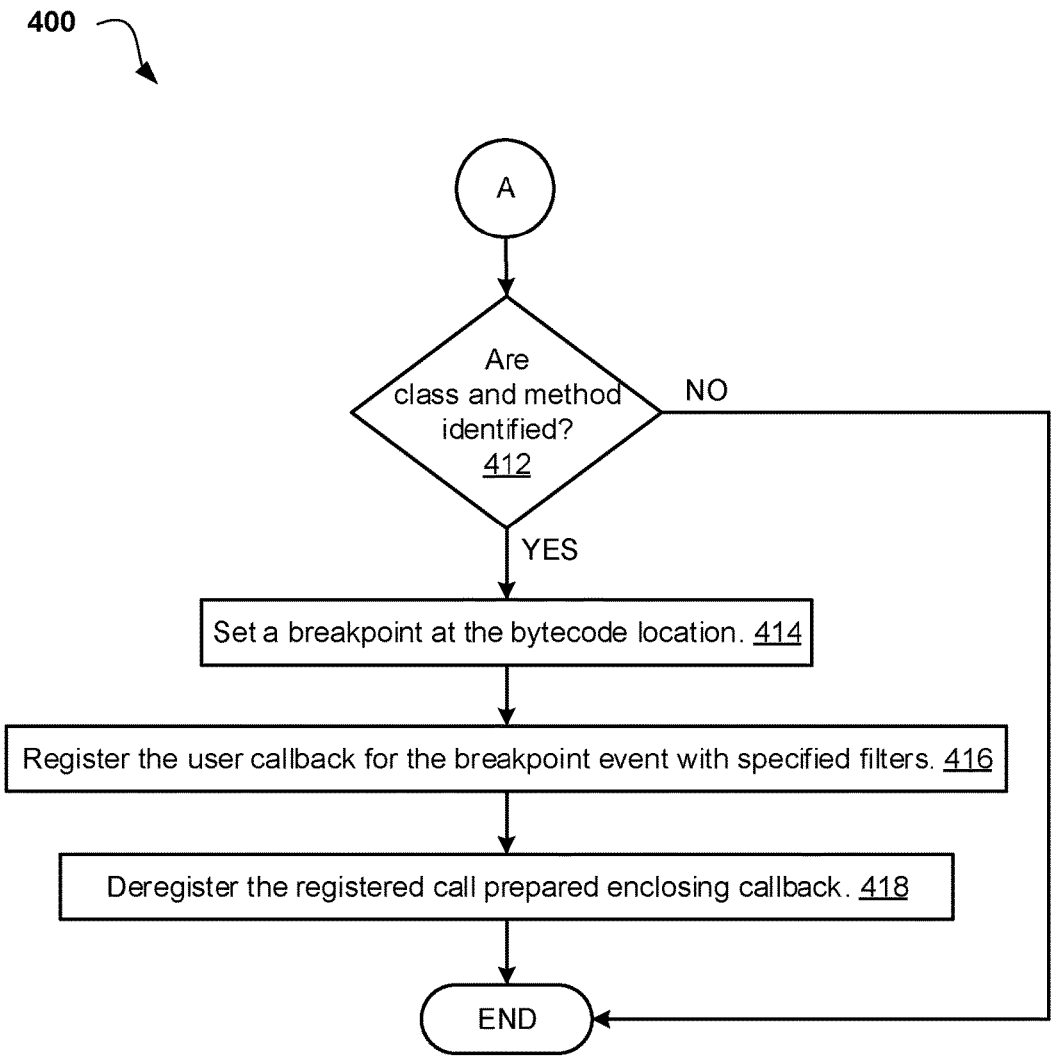

Referring now to FIGS. 4A and 4B, a bytecode injection simulation flowchart 400 of the steps carried out by a virtual machine multiple dispatch program is depicted, in accordance with one embodiment of the present invention. The bytecode injection simulation flowchart 400 may illustrate registering a specific method callback rather a general method callback. Typically, a JVMTI may require significant scaffolding code in order to register a callback which belongs to a class that has not been loaded or prepared in the JVM 114A, 114B (FIG. 1). However, the JVM Multiple Dispatch Program 112A, 112B (FIG. 1) may allow the registering of a callback belonging to an unloaded or unprepared class with minimal user input. In FIG. 4A, at 402, the JVM Multiple Dispatch Program 112A, 112B (FIG. 1) analyzes the received callback registration information from a user to register a callback. As previously described, when a user wishes to register a callback at a particular location, the user may specify callback registration information, such as the callback name, the callback class, the method name, the method signature, and the bytecode location.

At 404, the JVM Multiple Dispatch Program 112A, 112B (FIG. 1) determines whether the JVM 114A, 114B (FIG. 1) is live and the callback class is prepared. According to one implementation, the method may continue along the bytecode injection simulation flowchart 400, if the JVM 114A, 114B (FIG. 1) is live and the callback class is prepared. If the JVM 114A, 114B (FIG. 1) is not live, then the JVM 114A, 114B (FIG. 1) may have recently been initialized and remains in the startup phase. Furthermore, if the callback class specified by the user is not prepared, then the class has not yet been loaded and interpreted by the JVM 114A, 114B (FIG. 1). If the JVM Multiple Dispatch Program 112A, 112B (FIG. 1) determines the JVM 114A, 114B (FIG. 1) is live and the callback class is prepared (step 404, "YES" branch), the JVM Multiple Dispatch Program 112A, 112B (FIG. 1) may continue to step 410 to identify the class and method of the registered callback. If the JVM Multiple Dispatch Program 112A, 112B (FIG. 1) determines the JVM 114A, 114B (FIG. 1) is not live and the callback class is not prepared (step 404, "NO" branch), the JVM Multiple Dispatch Program 112A, 112B (FIG. 1) may continue to step 406 to prepare a class prepared enclosing callback with specified filters.

Then at 406, the JVM Multiple Dispatch Program 112A, 112B (FIG. 1) prepares a class enclosing callback with specified filters. A callback may only be registered by the JVM Multiple Dispatch Program 112A, 112B (FIG. 1) if the class that the callback refers to has been prepared in the JVM 114A, 114B (FIG. 1). If the callback class is not yet prepared, then the JVM Multiple Dispatch Program 112A, 112B (FIG. 1) may be required to wrap the particular callback in an enclosing callback that is triggered by the class prepare event for that particular class. An enclosing callback may be a container mechanism to allow the user specified callback to properly register to a JVM event, such as a breakpoint event, when the class to which the user specified callback applies has not yet been loaded or prepared in the JVM 114A, 114B (FIG. 1). The class prepared enclosing callback may be a mechanism to delay registering the user specified callback until the class associated with the user specified callback has been prepared. Furthermore, the enclosing callback may belong to a prepared class in the JVM 114A, 114B (FIG. 1). For example, if the JVM Multiple Dispatch Program 112A, 112B (FIG. 1) receives registration information for a callback that is not part of a class that is prepared in the JVM 114A, 114B (FIG. 1), then the JVM Multiple Dispatch Program 112A, 112B (FIG. 1) may enclose the callback in another callback associated with a prepared class in the JVM 114A, 114B (FIG. 1).

Next at 408, the JVM Multiple Dispatch Program 112A, 112B (FIG. 1) registers the class prepared enclosing callback with specified filters. Since the user specified callback to be registered is now enclosed within a class prepared callback, the user specified callback may be registered within the class prepared enclosing callback. For example, if the class prepare event relates to class MyObject, the filtering mechanism may trigger the callback to execute if the enclosing callback belongs to the class MyObject. Additionally, the JVM Multiple Dispatch Program 112A, 112B (FIG. 1) may determine the specified filters using the callback registration information associated with the user specified callback.

Next at 410, the JVM Multiple Dispatch Program 112A, 112B (FIG. 1) identifies the class and method of the user specified callback. Once the JVM Multiple Dispatch Program 112A, 112B (FIG. 1) determines the JVM 114A, 114B (FIG. 1) is live and the callback class is prepared, then the JVM Multiple Dispatch Program 112A, 112B (FIG. 1) may identify the class and method of the user specified callback. The class and method of the user specified callback may be identified using the callback registration information provided by the user.

Referring now to FIG. 4B, at 412, the JVM Multiple Dispatch Program 112A, 112B (FIG. 1) determines whether the class and method are identified within the JVM 114A, 114B (FIG. 1). According to one implementation, the method may continue along the bytecode injection simulation flowchart 400, if the class and method are found. If the JVM Multiple Dispatch Program 112A, 112B (FIG. 1) determines the class and method are found (step 412, "YES" branch), the JVM Multiple Dispatch Program 112A, 112B (FIG. 1) may continue to step 414 to set a breakpoint at the bytecode location. If the JVM Multiple Dispatch Program 112A, 112B (FIG. 1) determines the class and method are not found (step 412, "NO" branch), the JVM Multiple Dispatch Program 112A, 112B (FIG. 1) may terminate.

Next at 414, the JVM Multiple Dispatch Program 112A, 112B (FIG. 1) sets a breakpoint event at the bytecode location. Once the JVM Multiple Dispatch Program 112A, 112B (FIG. 1) identifies the class and method of the user specified callback, JVM Multiple Dispatch Program 112A, 112B (FIG. 1) may then set a breakpoint event in the bytecode at the location of the user specified callback.

Then at 416, the JVM Multiple Dispatch Program 112A, 112B (FIG. 1) registers the user callback for the set breakpoint event with specified filters. Once the JVM Multiple Dispatch Program 112A, 112B (FIG. 1) has set the breakpoint at the bytecode location, the JVM Multiple Dispatch Program 112A, 112B (FIG. 1) may register the user specified callback within the class prepared enclosing callback to the set breakpoint event using the specified filters provided in the callback registration information.

Then at 418, the JVM Multiple Dispatch Program 112A, 112B (FIG. 1) deregisters the class prepared enclosing callback. If the JVM Multiple Dispatch Program 112A, 112B (FIG. 1) using a class prepared enclosing callback to assist in the registration of the user specified callback, the JVM Multiple Dispatch Program 112A, 112B (FIG. 1) may deregister the class prepared enclosing callback. Since the user specified callback is wrapped in a class prepared enclosing callback at this stage and, once the class prepared event occurs, the enclosing callback may no longer be needed, the JVM Multiple Dispatch Program 112A, 112B (FIG. 1) may deregister the class prepared enclosing callback. Once the class prepared enclosing callback is deregistered, the user specified callback remains in the same location and is registered to the same set breakpoint event to which the class prepared enclosing callback was registered.

Figure 5A:
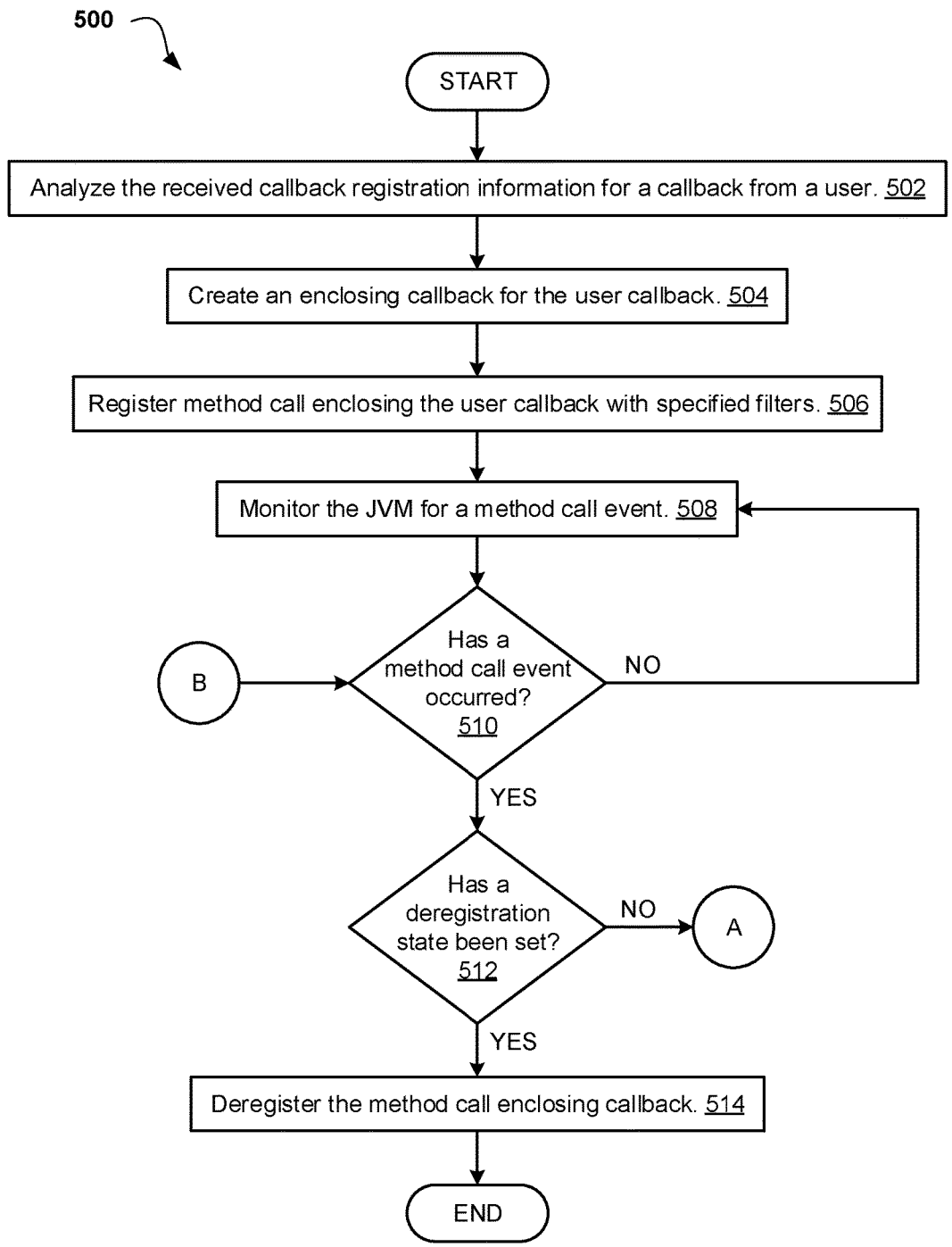
FIGS. 5A and 5B illustrate a method exit simulation flowchart of the steps carried out by a virtual machine multiple dispatch program, in accordance with one embodiment of the present invention.
Figure 5B:
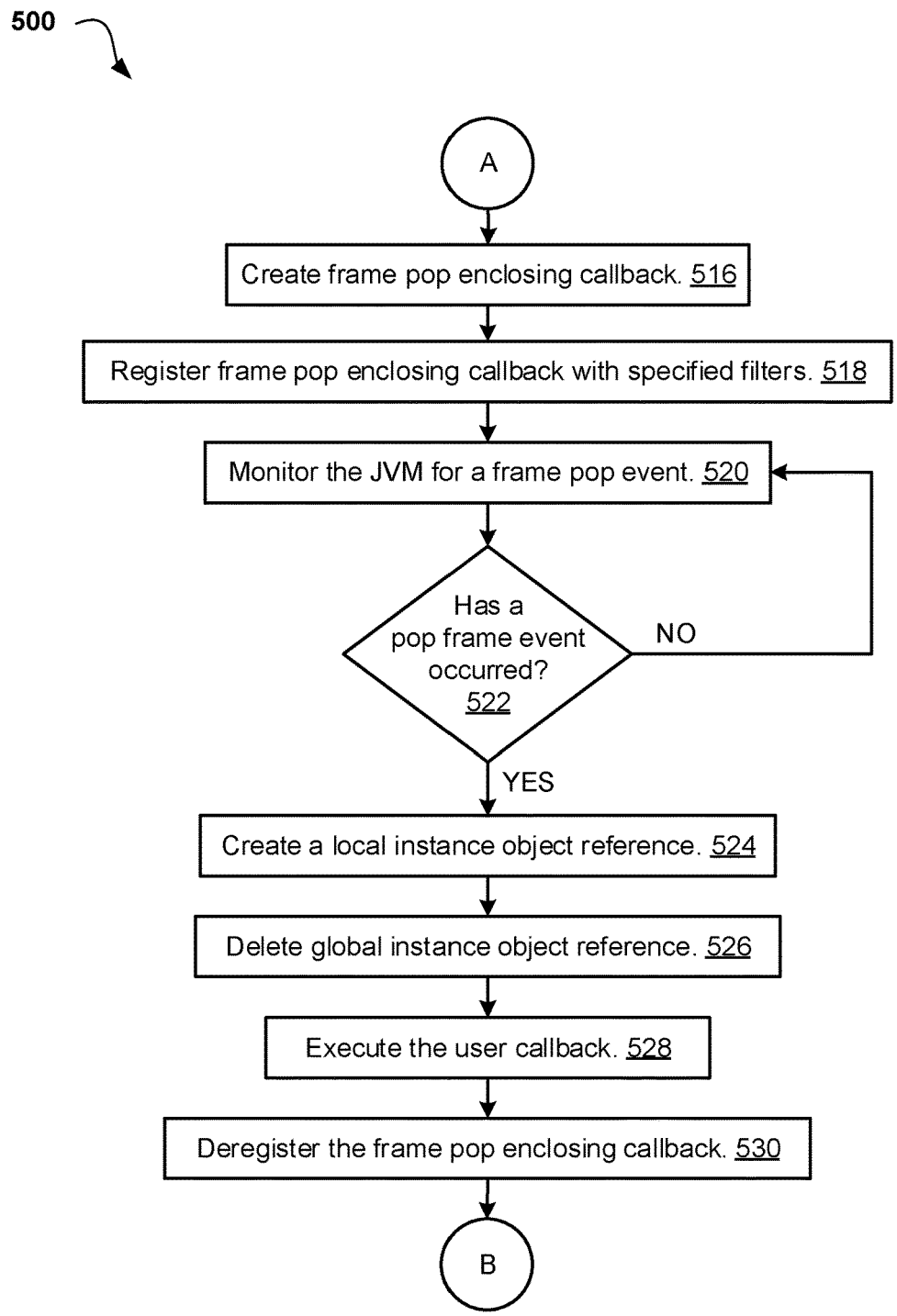

Referring now to FIGS. 5A and 5B, a method exit simulation flowchart 500 of the steps carried out by a virtual machine multiple dispatch program is depicted, in accordance with one embodiment of the present invention. Where the bytecode injection simulation flowchart 400 (FIGS. 4A and 4B) demonstrates registering a callback at a method entry (i.e. a bytecode location of zero is provided), the method exit simulation flowchart 500 may illustrate registering a callback at a method exit from any point within the method without registering a callback to every exit point within the method, which may be a pseudo-event in the JVM 114A, 114B (FIG. 1). If the user wishes to know when a method has completed execution, the JVM Multiple Dispatch Program 112A, 112B (FIG. 1) may proceed through the steps illustrated in the bytecode injection simulation flowchart 400 (FIGS. 4A and 4B) then continue to the method exit simulation flowchart 500 to register for a method exit event, or method return event. A method return event may related to a virtual machine tool interface event, such as a JVMTI event, that executes when each method returns, or exits. In FIG. 5A, at 502, the JVM Multiple Dispatch Program 112A, 112B (FIG. 1) analyzes the callback registration information for a callback from the user. As previously described, when a user wishes to register a callback for a method return event, the user may specify callback registration information, such as the particular callback being registered, the callback class, the method name, and the method signature.

Then at 504, the JVM Multiple Dispatch Program 112A, 112B (FIG. 1) creates an enclosing callback based on the received callback registration information. Once the JVM Multiple Dispatch Program 112A, 112B (FIG. 1) receives the user callback registration information that indicates the user callback is to be registered for a method return event, the JVM Multiple Dispatch Program 112A, 112B (FIG. 1) may create a callback, such as an enclosing method callback, in which to enclose the user callback. As previously described, an enclosing callback may be a container mechanism to allow the user specified callback to properly register to a JVM event, such as a breakpoint event. Once the enclosing callback is created by the JVM Multiple Dispatch Program 112A, 112B (FIG. 1), the JVM Multiple Dispatch Program 112A, 112B (FIG. 1) may wrap the user callback in the created enclosing callback.

Next at 506, the JVM Multiple Dispatch Program 112A, 112B (FIG. 1) registers the enclosing method callback with specified filters. Once the JVM Multiple Dispatch Program 112A, 112B (FIG. 1) wraps the enclosing callback around the user callback, the JVM Multiple Dispatch Program 112A, 112B (FIG. 1) may register the enclosing callback for a method call event based on the received callback registration information. As previously described, the method call event, such as a breakpoint event, may be a pseudo-event within the JVM 114A, 114B (FIG. 1) for registered user callbacks. Since the user may be interested in the occurrence of a specific method call event, registering the enclosing callback to the occurrence of the specific method call event may allow the user to be notified of the event's occurrence or the JVM 114A, 114B (FIG. 1) performs a user-desired action.

Then at 508, the JVM Multiple Dispatch Program 112A, 112B (FIG. 1) monitors the JVM 114A, 114B (FIG. 1) for a method call event. Once the enclosing method callback is registered, the JVM Multiple Dispatch Program 112A, 112B (FIG. 1) may monitor the JVM 114A, 114B (FIG. 1) for the occurrence of a method call event.

Next at 510, the JVM Multiple Dispatch Program 112A, 112B (FIG. 1) determines whether a method call event has occurred. According to one implementation, the method may continue along the method exit simulation flowchart 500, if a method call event has occurred. If the JVM Multiple Dispatch Program 112A, 112B (FIG. 1) determines a method call event has occurred (step 510, "YES" branch), the JVM Multiple Dispatch Program 112A, 112B (FIG. 1) may continue to step 512 to determine whether a deregistration state has been set. If the JVM Multiple Dispatch Program 112A, 112B (FIG. 1) determines a method call event has not occurred (step 510, "NO" branch), the JVM Multiple Dispatch Program 112A, 112B (FIG. 1) may return to step 508 to monitor the JVM 114A, 114B (FIG. 1) for a method call event.

Then at 512, the JVM Multiple Dispatch Program 112A, 112B (FIG. 1) determines whether a deregistration state has been set. According to one implementation, the method may continue along the method exit simulation flowchart 500, if a deregistration state has been set. The deregistration state may be a setting associated with the enclosing method call callback that triggers the JVM Multiple Dispatch Program 112A, 112B (FIG. 1) to deregister the enclosing callback. During an initial occurrence of a method call event, the deregistration state of the enclosing method call callback may not be set. If the JVM Multiple Dispatch Program 112A, 112B (FIG. 1) determines a deregistration state has been set (step 512, "YES" branch), the JVM Multiple Dispatch Program 112A, 112B (FIG. 1) may continue to step 514 to deregister the enclosing callback. If the JVM Multiple Dispatch Program 112A, 112B (FIG. 1) determines a deregistration state has not been set (step 512, "NO" branch), the JVM Multiple Dispatch Program 112A, 112B (FIG. 1) may continue to step 516 to create a frame pop enclosing callback.

Next at 514, the JVM Multiple Dispatch Program 112A, 112B (FIG. 1) deregisters the method call enclosing callback. If the JVM Multiple Dispatch Program 112A, 112B (FIG. 1) determines a deregistration state has been set, using a method call enclosing callback, the JVM Multiple Dispatch Program 112A, 112B (FIG. 1) may deregister the method call enclosing callback when the deregistration state has been set. Since the user specified callback is wrapped in a method call enclosing callback and the deregistration state has been set, the JVM Multiple Dispatch Program 112A, 112B (FIG. 1) may deregister the method call enclosing callback. Since the user specified callback is embedded within the method call enclosing callback, once the method call enclosing callback is deregistered, each of the callbacks (i.e. the method call enclosing callback and the user specified callback) are discarded. Once the method call enclosing callback is deregistered, the JVM Multiple Dispatch Program 112A, 112B (FIG. 1) may terminate.

Referring now to FIG. 5B, at 516, the JVM Multiple Dispatch Program 112A, 112B (FIG. 1) creates a frame pop enclosing callback. When a method is exited, or returned, the frame for that particular method may be popped, or removed, off of the frame stack. Therefore, when a method return event occurs, a frame pop event may occur. A frame pop event may occur when the method reaches the end of the execution cycle, an explicit return is reached at some point during the logic execution, or some exception occurs that causes an exit from the method. Furthermore, the JVM Multiple Dispatch Program 112A, 112B (FIG. 1) may need to receive a notification of when the frame pop event occurs. Therefore, the JVM Multiple Dispatch Program 112A, 112B (FIG. 1) may create a frame pop enclosing callback, which may contain the user callback, the deregistration state, and, if the method is not static, references to the instance object. Once created the frame pop event is created, the JVM Multiple Dispatch Program 112A, 112B (FIG. 1) may set the frame pop notification for the current frame. The instance object may only be applicable for instance methods. Additionally, since a local instance object reference may not survive the frame pop event, the JVM Multiple Dispatch Program 112A, 112B (FIG. 1) may create a global reference between the method object and the method return. Furthermore, the frame pop enclosing callback may be another callback used to enclose the already enclosed user callback.

Then at 518, the JVM Multiple Dispatch Program 112A, 112B (FIG. 1) registers the frame pop enclosing callback with specified filters. Upon creation, the frame pop enclosing callback may be registered to a frame pop event. Even though the user is ultimately interested in the method return event, the JVM Multiple Dispatch Program 112A, 112B (FIG. 1) may not register for the method return event until the method actually occurs. Therefore, the JVM Multiple Dispatch Program 112A, 112B (FIG. 1) may first enclose the user callback in an enclosing callback in step 506 (FIG. 5A) so that the method may first occur. Once the method has started, the method return may occur when the stack frame is terminated, or popped. Therefore, the JVM Multiple Dispatch Program 112A, 112B (FIG. 1) may enclose the user callback in another enclosing callback (i.e. the frame pop enclosing callback) that is filtered, or registered, to the frame pop event.

Next at 520, the JVM Multiple Dispatch Program 112A, 112B (FIG. 1) monitors the JVM 114A, 114B (FIG. 1) for a frame pop event. Once the frame pop method callback is created and registered, the JVM Multiple Dispatch Program 112A, 112B (FIG. 1) may monitor the JVM 114A, 114B (FIG. 1) for the occurrence of the frame pop event.

Then at 522, the JVM Multiple Dispatch Program 112A, 112B (FIG. 1) determines whether a frame pop event has occurred. According to one implementation, the method may continue along the method exit simulation flowchart 500, if a frame pop event has occurred. As previously described, the frame pop event may occur when the method reaches the end of the execution cycle, an explicit return is reached at some point during the logic execution, or some exception occurs that causes an exit from the method. If the JVM Multiple Dispatch Program 112A, 112B (FIG. 1) determines a frame pop event has occurred (step 522, "YES" branch), the JVM Multiple Dispatch Program 112A, 112B (FIG. 1) may continue to step 524 to create a local instance object reference. If the JVM Multiple Dispatch Program 112A, 112B (FIG. 1) determines a frame pop event has not occurred (step 522, "NO" branch), the JVM Multiple Dispatch Program 112A, 112B (FIG. 1) may return to step 520 to monitor the JVM 114A, 114B (FIG. 1) for a frame pop event.

Next at 524, the JVM Multiple Dispatch Program 112A, 112B (FIG. 1) creates a local instance object reference. Once the frame pop event occurs, the JVM Multiple Dispatch Program 112A, 112B (FIG. 1) may create a local reference to the stack frame's instance object. The JVM 114A, 114B (FIG. 1) may include static and non-static methods. When a non-static method return is registered, a local reference to the method's instance object for which the method return is associated may be desired. However, as previously described, due to the natural operation of frame popping, the local reference between the actual object and the method exit may be lost. Therefore, the JVM Multiple Dispatch Program 112A, 112B (FIG. 1) may create global references when creating the frame pop enclosing callback in step 516 that may be capable of surviving the frame pop event. Once the frame pop event occurs, the JVM Multiple Dispatch Program 112A, 112B (FIG. 1) may recreate the local instance reference that may have been lost between the method object and the method return.

Then at 526, the JVM Multiple Dispatch Program 112A, 112B (FIG. 1) deletes the global instance object reference. Once the JVM Multiple Dispatch Program 112A, 112B (FIG. 1) has created the local instance object reference after the occurrence of the frame pop event, the JVM Multiple Dispatch Program 112A, 112B (FIG. 1) may delete the global instance object reference since the global instance object reference may no longer be needed. At this stage, the global instance object reference has served the purpose of preserving the reference between the method object and the method return.

Next at 528, the JVM Multiple Dispatch Program 112A, 112B (FIG. 1) executes the user callback. Once the global instance reference object is deleted, the JVM Multiple Dispatch Program 112A, 112B (FIG. 1) may execute the user callback. During execution, the frame pop enclosing callback may pass through the local instance object to which the reference was created in step 524 to the user callback. Furthermore, the deregistration state of the method call enclosing callback may be set when the user callback signals to be deregistered during the course of execution. Therefore, when the method exit simulation flowchart 500 returns to step 512 (FIG. 5A) during the normal course of operation, the method call enclosing callback may be deregistered. Additionally, the local instance object reference may be deleted once the user callback is executed.

Then at 530, the JVM Multiple Dispatch Program 112A, 112B (FIG. 1) deregisters the frame pop enclosing callback. Once the user callback is executed, the JVM Multiple Dispatch Program 112A, 112B (FIG. 1) may deregister the frame pop enclosing callback since the frame pop enclosing callback is no longer needed. The frame pop enclosing callback is no longer needed since the method return has occurred in the form of the frame pop event. Therefore, the event in which the user was originally interested in (i.e. the method return) has occurred and the device used to bring the user callback to that event (i.e. the frame pop enclosing callback) may be deregistered from the frame pop event.

Figure 6:
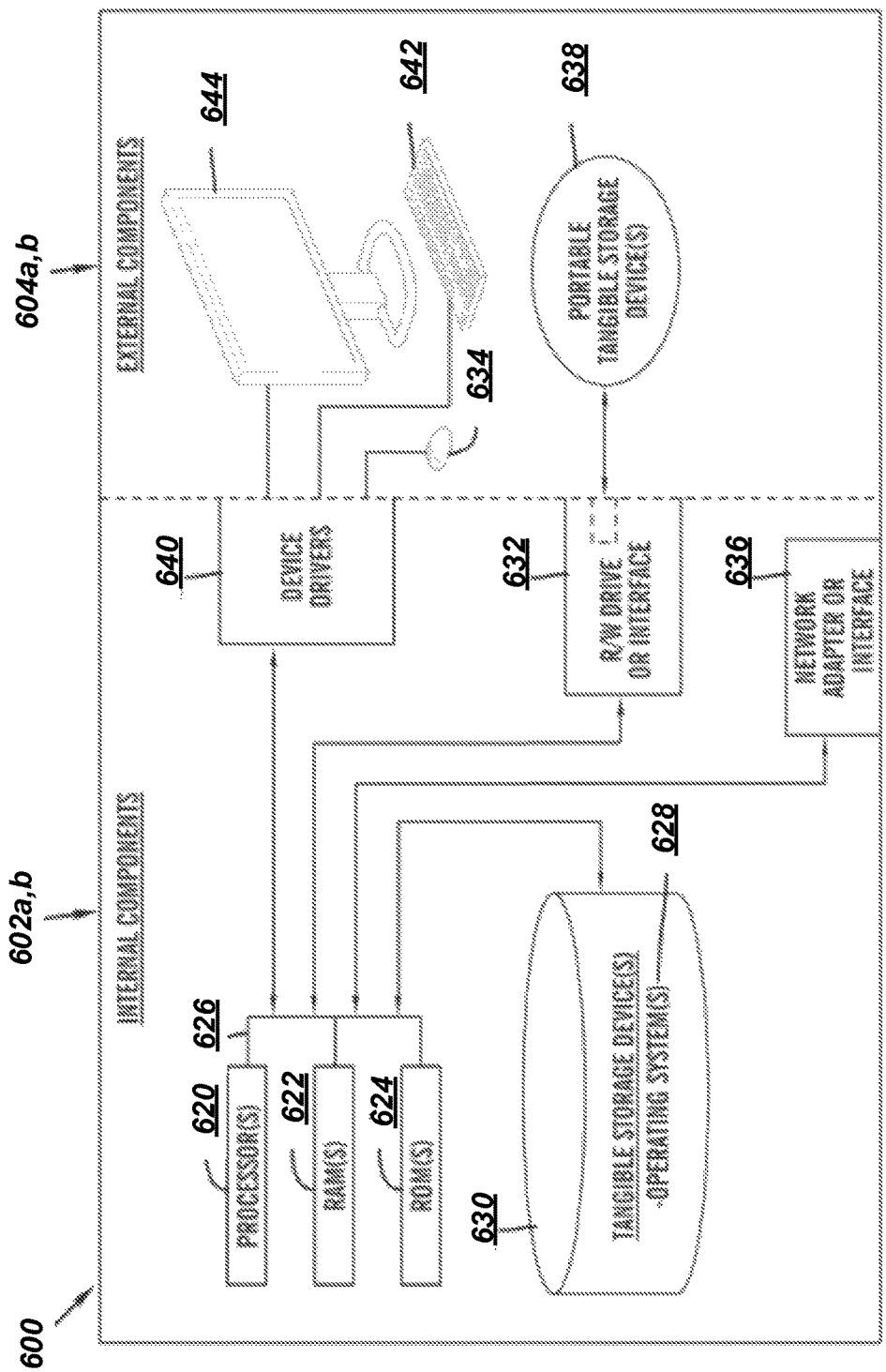
FIG. 6 is a block diagram of internal and external components of computers and servers depicted in FIG. 1 according to at least one embodiment.

FIG. 6 is a block diagram 600 of internal and external components of the client computing device 110 and the server 120 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 110 (FIG. 1) and the server 120 (FIG. 1) may include respective sets of internal components 602 a,b and external components 604 a,b illustrated in FIG. 6. Each of the sets of internal components 602 include one or more processors 620, one or more computer-readable RAMs 622 and one or more computer-readable ROMs 624 on one or more buses 626, and one or more operating systems 628 and one or more computer-readable tangible storage devices 630. The one or more operating systems 628, the JVM Multiple Dispatch Program 112A (FIG. 1) and JVM 114A (FIG. 1) in the client computing device 110 (FIG. 1), and the JVM Multiple Dispatch Program 112B (FIG. 1) and JVM 114B (FIG. 1) in the server 120 (FIG. 1) are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the JVM Multiple Dispatch Program 112A, 112B (FIG. 1), can be stored on one or more of the respective portable computer-readable tangible storage devices 638, read via the respective R/W drive or interface 632 and loaded into the respective hard drive 630.

Each set of internal components 602 a,b also includes network adapters or interfaces 636 such as a TCP/IP adapter cards, wireless Wi-Fi interface cards, or 3G or 4G wireless interface cards or other wired or wireless communication links. The JVM Multiple Dispatch Program 112A (FIG. 1) and JVM 114A (FIG. 1) in the client computing device 110 (FIG. 1) and the JVM Multiple Dispatch Program 112B (FIG. 1) and JVM 114B (FIG. 1) in the server 120 (FIG. 1) can be downloaded to the client computing device 110 (FIG. 1) and the server 120 (FIG. 1) from an external computer via a network (for example, the Internet, a local area network or other, wide area network) and respective network adapters or interfaces 636. From the network adapters or interfaces 636, the JVM Multiple Dispatch Program 112A (FIG. 1) and JVM 114A (FIG. 1) in the client computing device 110 (FIG. 1) and the JVM Multiple Dispatch Program 112B (FIG. 1) and JVM 114B (FIG. 1) in the server 120 (FIG. 1) are loaded into the respective hard drive 630. The network may comprise copper wires, optical fibers, wireless transmission, routers, firewalls, switches, gateway computers and/or edge servers.

Each of the sets of external components 604 a,b can include a computer display monitor 644, a keyboard 642, and a computer mouse 634. External components 604 a,b can also include touch screens, virtual keyboards, touch pads, pointing devices, and other human interface devices. Each of the sets of internal components 602 a,b also includes device drivers 640 to interface to computer display monitor 644, keyboard 642, and computer mouse 634. The device drivers 640, R/W drive or interface 632 and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
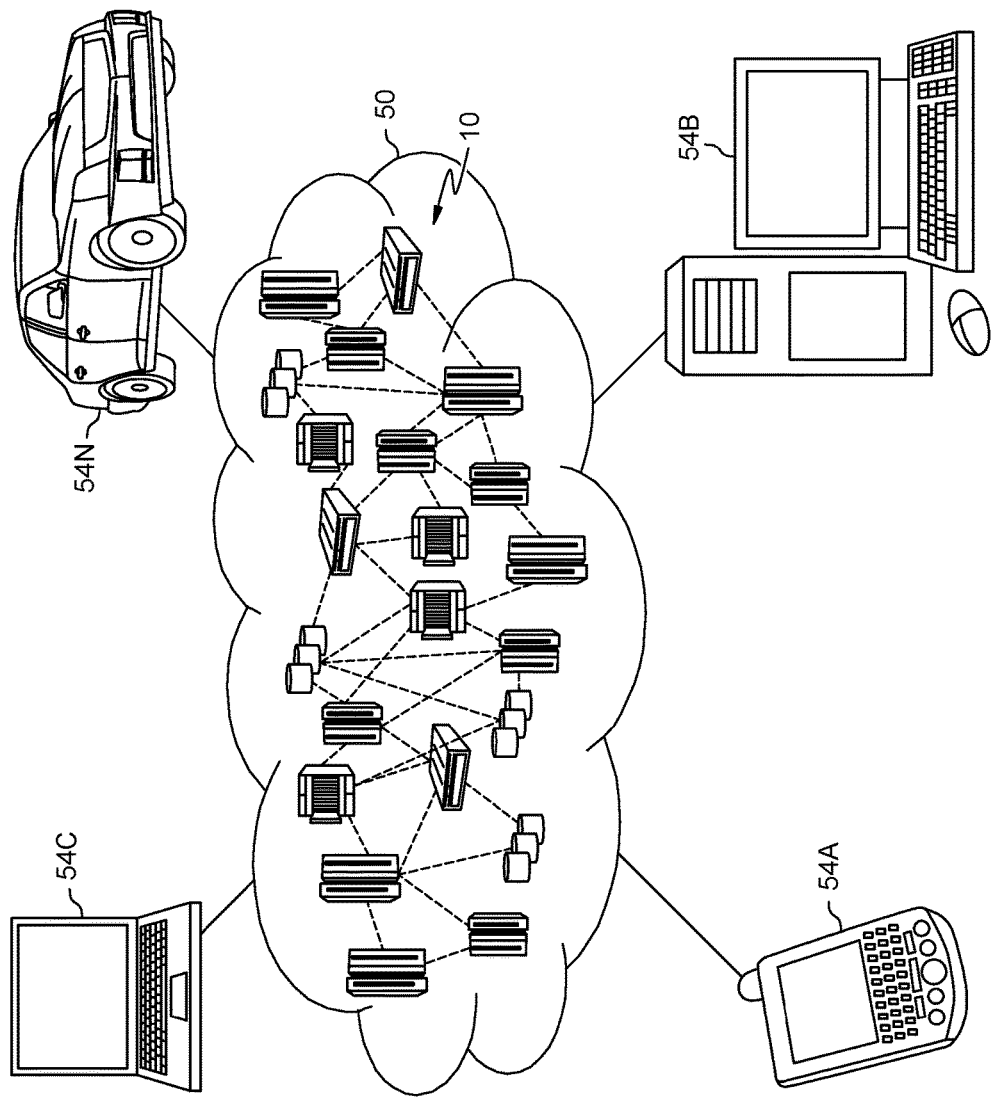
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
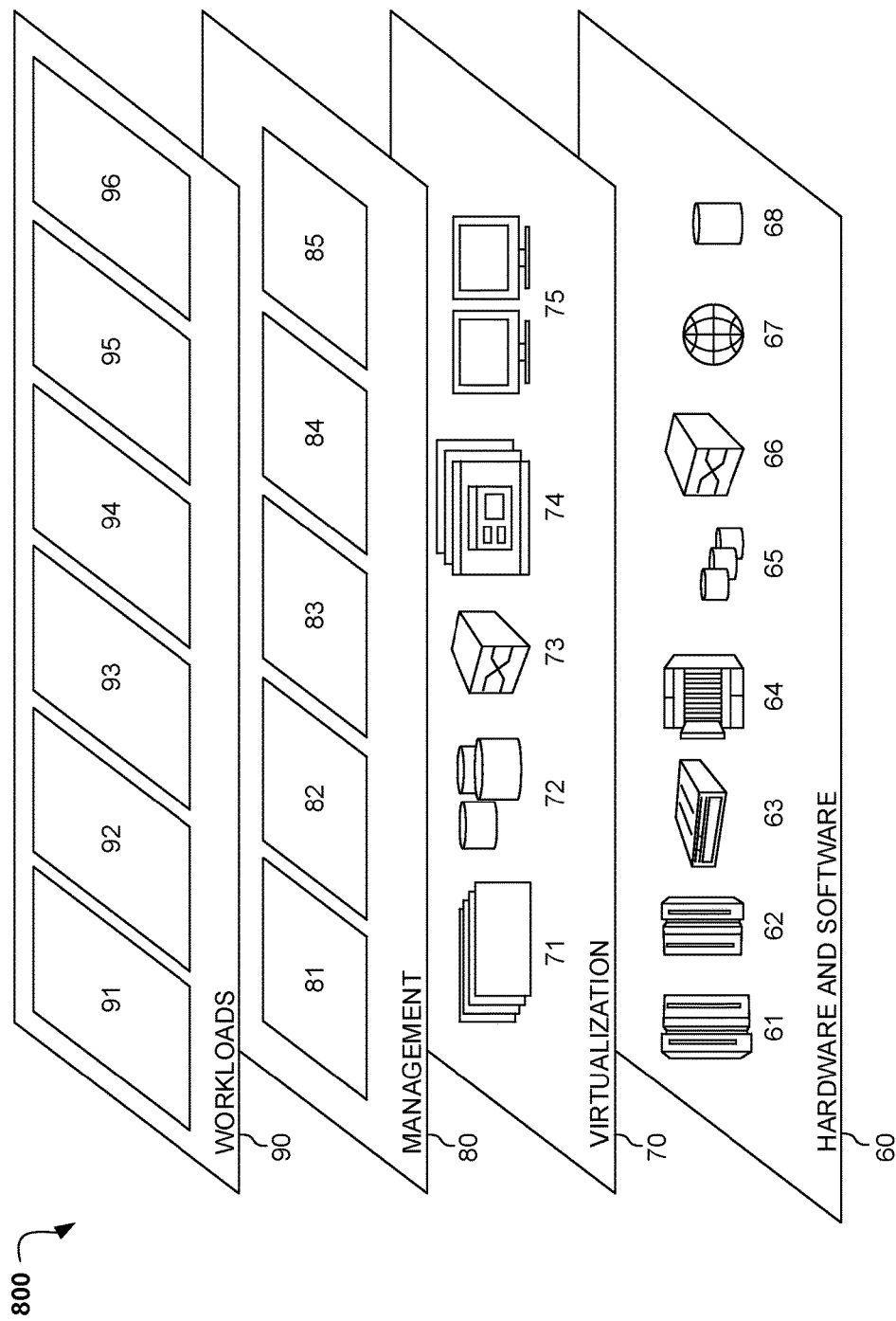
FIG. 8 depicts abstraction model layers according to an embodiment of the present invention.

Referring now to FIG. 8 a set of functional abstraction layers 800 provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multiple user callback registration 96. Multiple user callback registration 96 may refer to utilizing a multiple dispatch system as an add-on to a virtual machine tool interface to enable registration and deregistration of multiple callbacks for a virtual machine event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for registering a plurality of callbacks, the method comprising:
   registering each of a plurality of callback functions in a virtual machine tool interface within a virtual machine to a list of callback functions for an event based on a plurality of event context elements associated with each callback function;
   in response to the event occurring, generating a local frame for each registered callback function within the list of callback functions for the determined event; and
   executing each registered callback function, concurrently, based on each generated local frame associated with each at least one registered callback function.

2. The method of claim 1, further comprising:
   determining each registered callback function is to be deregistered;
   terminating the generated local frame; and
   deregistering each determined callback function.

3. The method of claim 1, wherein the event includes at least one of a breakpoint event, a class prepared event, a method call event, a virtual machine death event, or a frame pop event.

4. The method of claim 1, wherein the plurality of event context elements includes at least one of a callback name, a callback class, a method name, a method signature, or a bytecode location.

5. The method of claim 1, wherein executing each registered callback function further comprises:
   determining each of the plurality of event context elements matches a user specified filter;
   executing each registered callback function within the virtual machine;
   determining an applicable native exception applies to any registered callback function; and
   processing the applicable native exception to each registered callback function.

6. The method of claim 1, wherein registering each received callback function includes registering each callback function during a startup of the virtual machine tool interface when a plurality of class files have not been prepared using at least one class prepared enclosing callback.

7. The method of claim 1, wherein registering each callback function includes registering each callback function to at least one method exit using at least one method call enclosing callback and at least one frame pop enclosing callback.

8. A computer system for registering a plurality of callbacks, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   registering each of a plurality of callback functions in a virtual machine tool interface within a virtual machine to a list of callback functions for an event based on a plurality of event context elements associated with each callback function;
   in response to the event occurring, generating a local frame for each registered callback function within the list of callback functions for the determined event; and
   executing each registered callback function, concurrently, based on each generated local frame associated with each registered callback function.

9. The computer system of claim 8, further comprising:
   determining each registered callback function is to be deregistered;
   terminating the generated local frame; and
   deregistering each determined callback function.

10. The computer system of claim 8, wherein the event includes at least one of a breakpoint event, a class prepared event, a method call event, a virtual machine death event, or a frame pop event.

11. The computer system of claim 8, wherein the plurality of event context elements includes at least one of a callback name, a callback class, a method name, a method signature, or a bytecode location.

12. The computer system of claim 8, wherein executing each registered callback function further comprises:
   determining each of the plurality of event context elements matches a user specified filter;
   executing each registered callback function within the virtual machine;
   determining an applicable native exception applies to any registered callback function; and
   processing the applicable native exception to each registered callback function.

13. The computer system of claim 8, wherein registering each callback function includes registering each callback function during a startup of the virtual machine tool interface when a plurality of class files have not been prepared using at least one class prepared enclosing callback.

14. The computer system of claim 8, wherein registering each callback function includes registering each callback function to at least one method exit using at least one method call enclosing callback and at least one frame pop enclosing callback.

15. A computer program product for registering a plurality of callbacks, the computer program product comprising:
   one or more computer-readable tangible storage medium and program instructions stored on at least one of the one or more tangible storage medium, the program instructions executable by a processor capable of performing a method, the method comprising:

registering each of a plurality of callback functions in a virtual machine tool interface within a virtual machine to a list of callback functions for an event based on a plurality of event context elements associated with each callback function;

in response to the event occurring, generating a local frame for each registered callback function within the list of callback functions for the determined event; and executing each registered callback function, concurrently, based on each generated local frame associated with each registered callback function.

16. The computer program product of claim 15, further comprising:

determining each registered callback function is to be deregistered;

terminating the generated local frame; and deregistering each determined callback function.

17. The computer program product of claim 15, wherein the event includes at least one of a breakpoint event, a class prepared event, a method call event, a virtual machine death event, or a frame pop event.

18. The computer program product of claim 15, wherein each of the plurality of event context elements includes at least one of a callback name, a callback class, a method name, a method signature, or a bytecode location.

19. The computer program product of claim 15, wherein executing each registered callback function further comprises:

determining an event context element matches a user specified filter;

executing each registered callback function within the virtual machine;

determining an applicable native exception applies to any registered callback function; and processing the applicable native exception to each registered callback function.

20. The computer program product of claim 15, wherein registering each callback function includes registering each callback function during a startup of the virtual machine tool interface when a plurality of class files have not been prepared using at least one class prepared enclosing callback.

* * * * *